Figure 1:
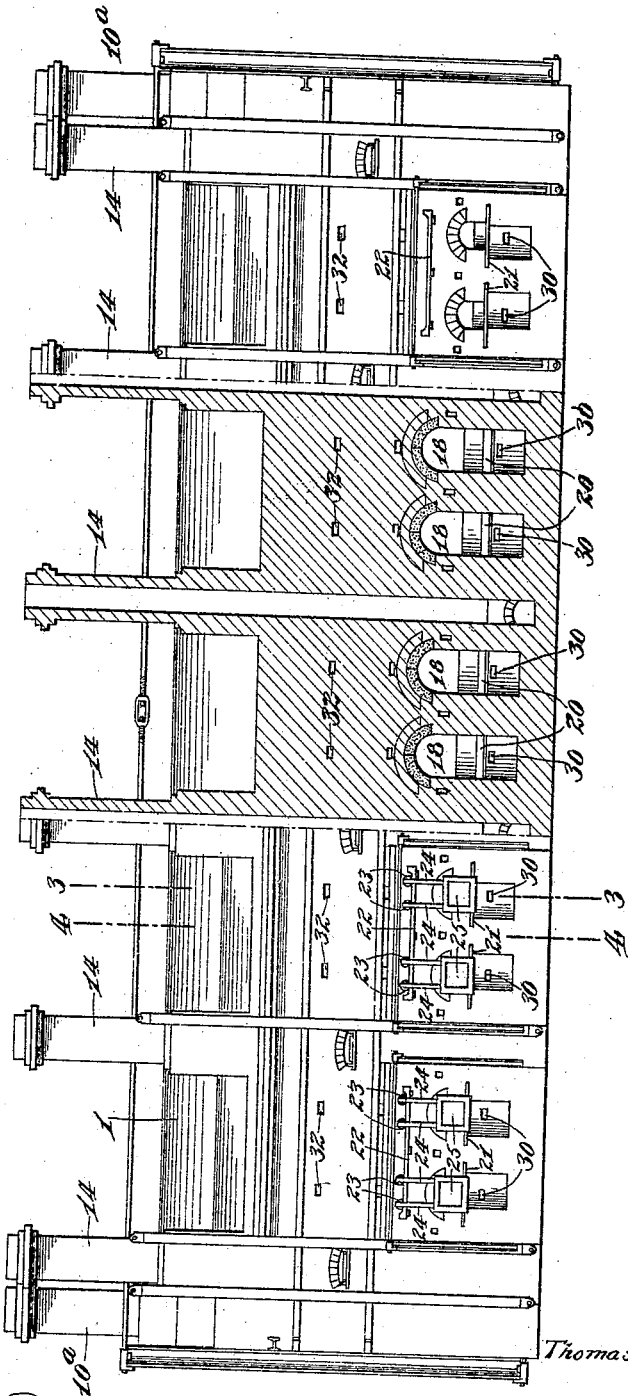

T. M. WILSON.
KILN.
APPLICATION FILED FEB. 20, 1909.

946,086.

Patented Jan. 11, 1910.
7 SHEETS—SHEET 1.

Witnesses
Thos. Cremann
J. A. L. Mulhall.

Inventor
Thomas M. Wilson,
By Joshua R. H. Potts.
Attorney

T. M. WILSON.
KILN.
APPLICATION FILED FEB. 20, 1909.

946,086.

Patented Jan. 11, 1910.
7 SHEETS—SHEET 2.

Witnesses

Inventor
Thomas M. Wilson,
By Joshua R. H. Potts
Attorney

T. M. WILSON.
KILN.
APPLICATION FILED FEB. 20, 1909.

946,086.

Patented Jan. 11, 1910.
7 SHEETS—SHEET 3.

Witnesses
Theo. Rosenaud.
J. A. L. Mulhall.

Inventor
Thomas M. Wilson,
By Joshua R. H. Potts
Attorney

T. M. WILSON.
KILN.
APPLICATION FILED FEB. 20, 1909.

946,086.

Patented Jan. 11, 1910.
7 SHEETS—SHEET 4.

Witnesses
Theo. Rosenand
J. T. L. Mulhall

Inventor
Thomas M. Wilson,
By Joshua R. H. Potts
Attorney

T. M. WILSON.
KILN.
APPLICATION FILED FEB. 20, 1909.

946,086.

Patented Jan. 11, 1910.
7 SHEETS—SHEET 5.

Witnesses
Theo. Premano
J. T. L. Mulhall.

Inventor
Thomas M. Wilson,
By Joshua R. H. Potts,
Attorney

T. M. WILSON.
KILN.
APPLICATION FILED FEB. 20, 1909.

946,086.

Patented Jan. 11, 1910.
7 SHEETS—SHEET 6.

Witnesses
Thos. Rosemond
J. A. L. Mulhall

Inventor
Thomas M. Wilson,
By Joshua R. H. Potts
Attorney

T. M. WILSON.
KILN.
APPLICATION FILED FEB. 20, 1909.
946,086.
Patented Jan. 11, 1910.
7 SHEETS—SHEET 7.
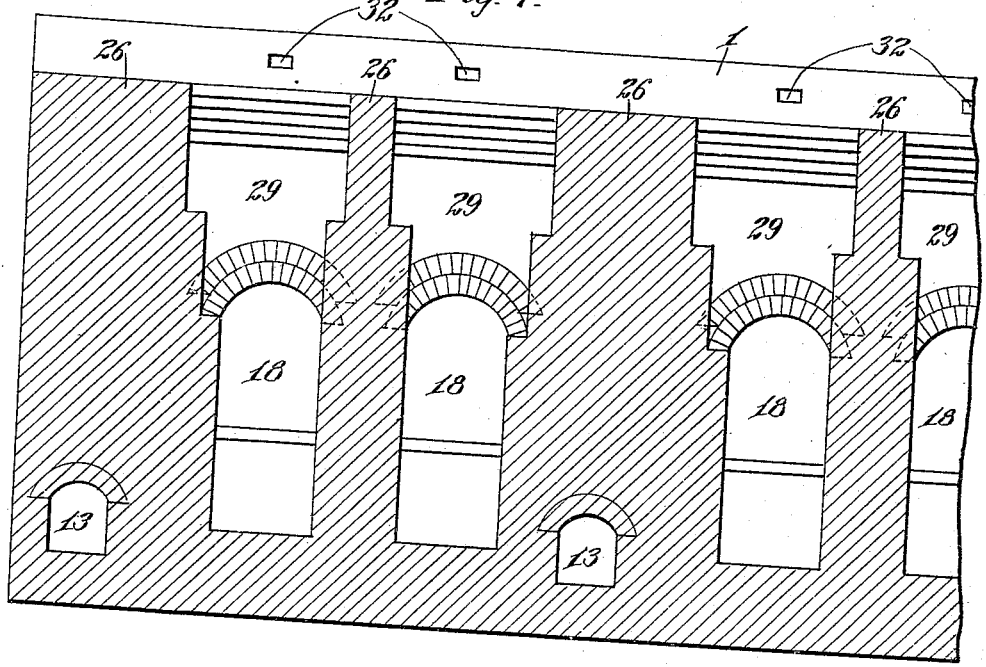
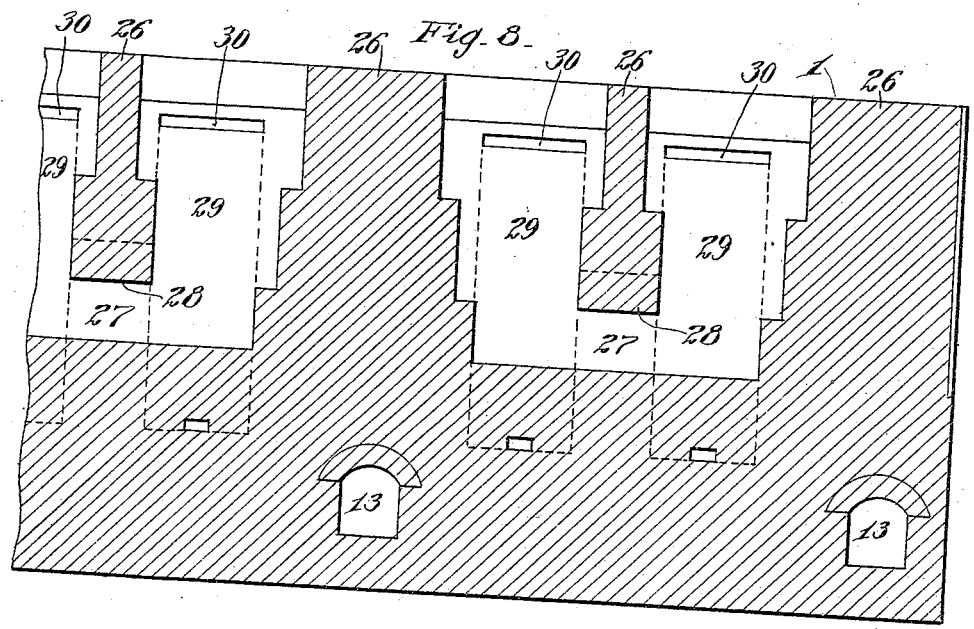
Witnesses
Thos. Rosmann
J. C. L. Mulhall
Inventor
Thomas M. Wilson,
By Joshua R. H. Potts
Attorney

UNITED STATES PATENT OFFICE.

THOMAS M. WILSON, OF PHILADELPHIA, PENNSYLVANIA.

KILN.

946,086.

Specification of Letters Patent.   Patented Jan. 11, 1910.

Application filed February 20, 1909.   Serial No. 479,243.

*To all whom it may concern:*

Be it known that I, THOMAS M. WILSON, a citizen of the United States, residing at Philadelphia, in the county of Philadelphia and State of Pennsylvania, have invented certain new and useful Improvements in Kilns, of which the following is a specification.

My invention relates to improvements in kilns, more particularly designed for burning brick, an object of the invention being to provide an improved arrangement of flues below the open work floor for directing the smoke and gases to stacks in the side walls of the kiln, and insuring a uniform distribution of the heat throughout the kiln.

A further object is to provide an improved arrangement of furnaces located in the side walls of the kiln, arranged in pairs, and provide stacks located between the several pairs of fire-boxes, and provide an improved arrangement of flues connecting the stacks with the interior space below the open work floor.
A further object is to provide an improved arrangement of floor supporting chords below the open work floor, which absolutely insure an equal distribution of the heat units throughout the interior of the kiln.
A further object is to provide an improved construction of furnace employing twin fire-boxes, insuring a combustion utilizing all the heat units in a given quantity of fuel.

A further object is to provide improvements of this character with an improved arrangement of flues, enabling the kiln, during its cooling operation to be utilized as an auxiliary heater for the driers of the plant.

Figure 2:
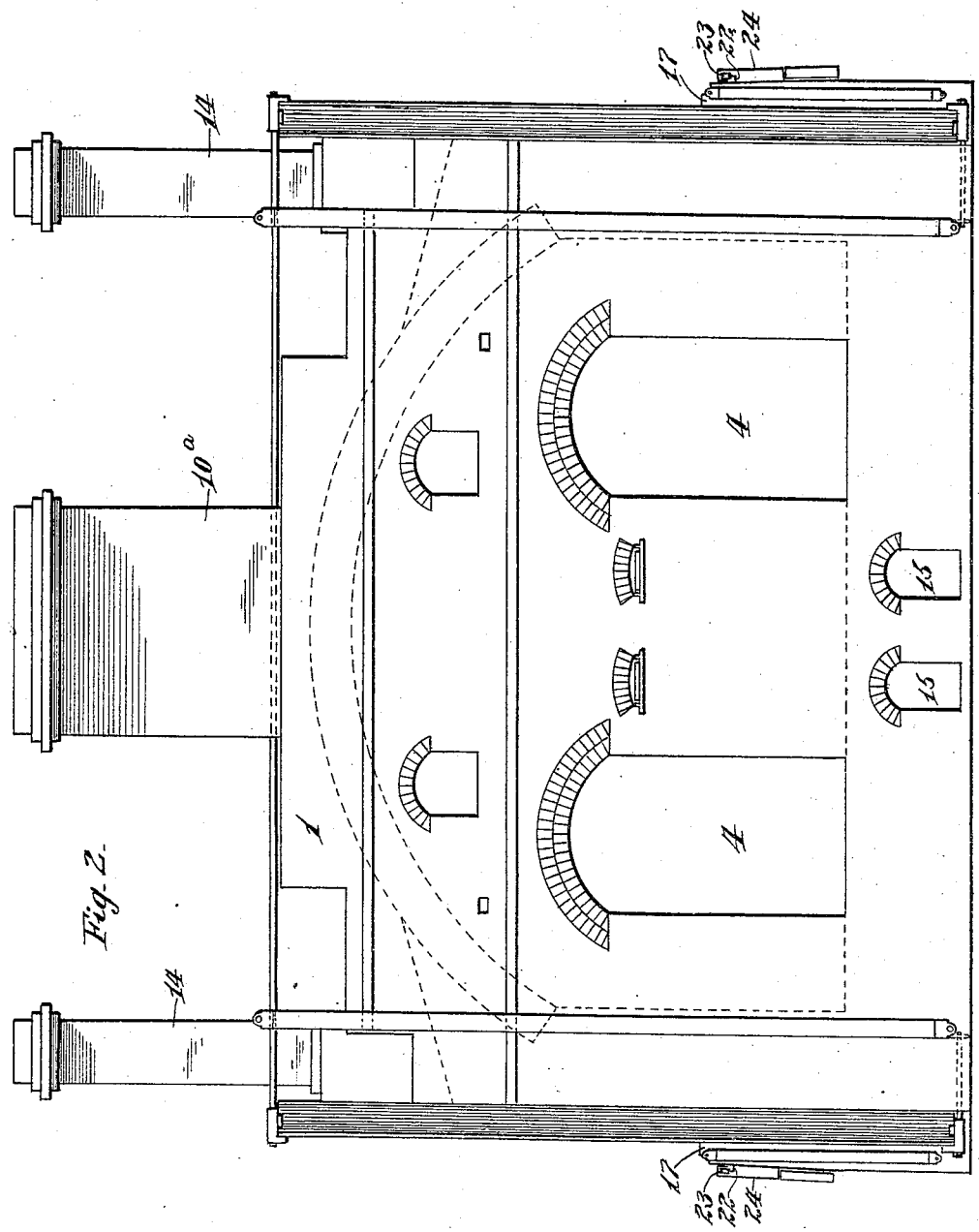
Figure 3:
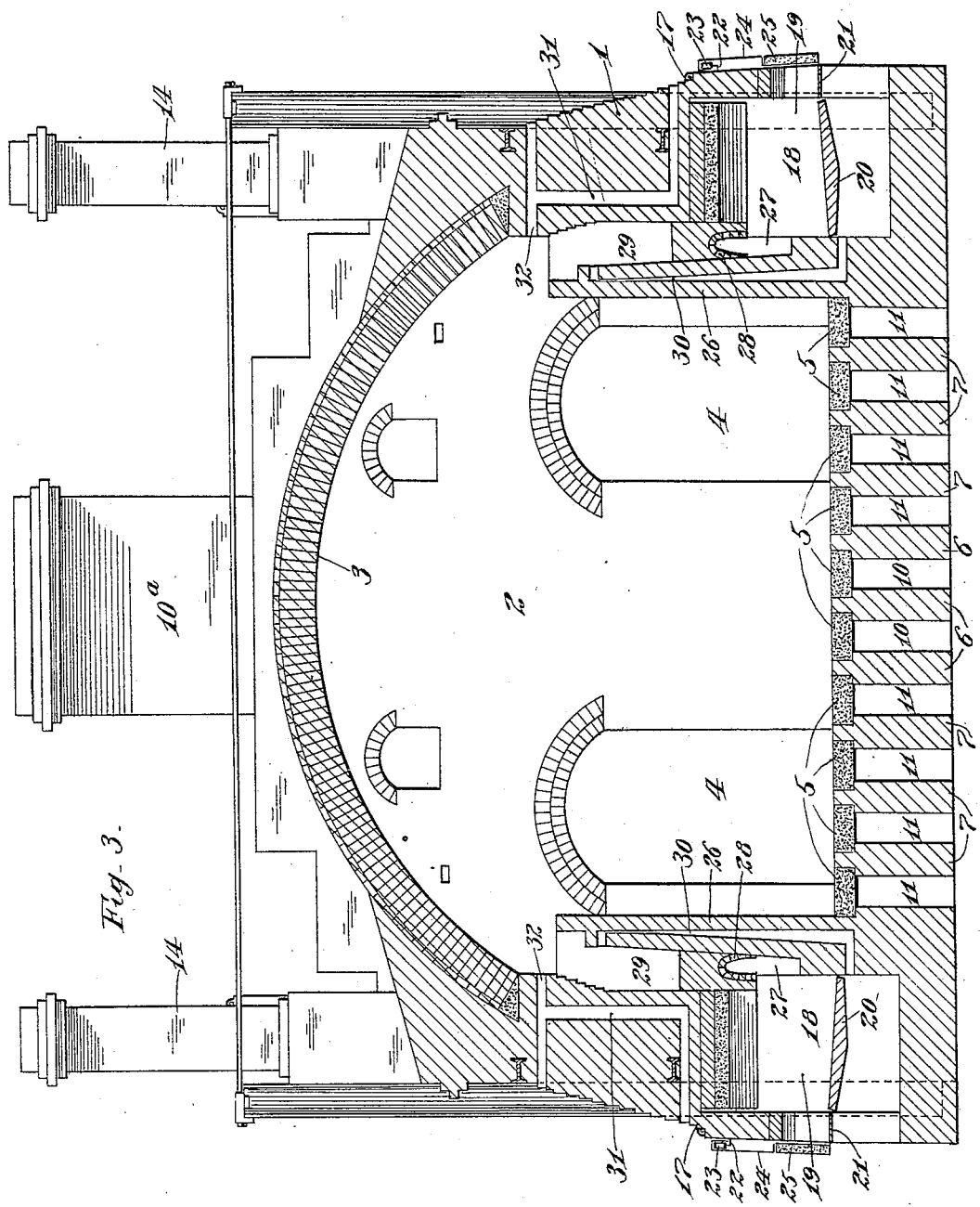
Figure 4:
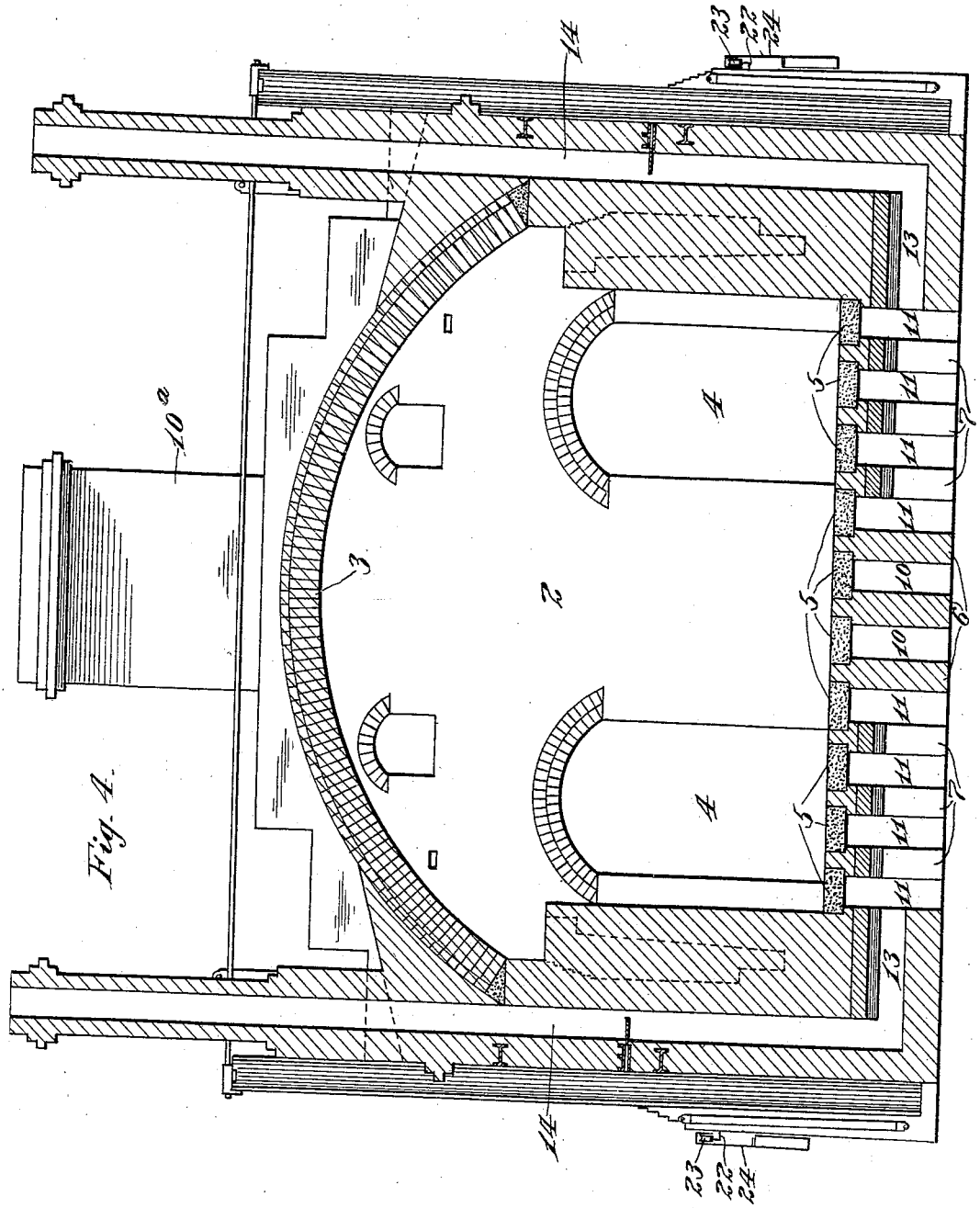
Figure 5:
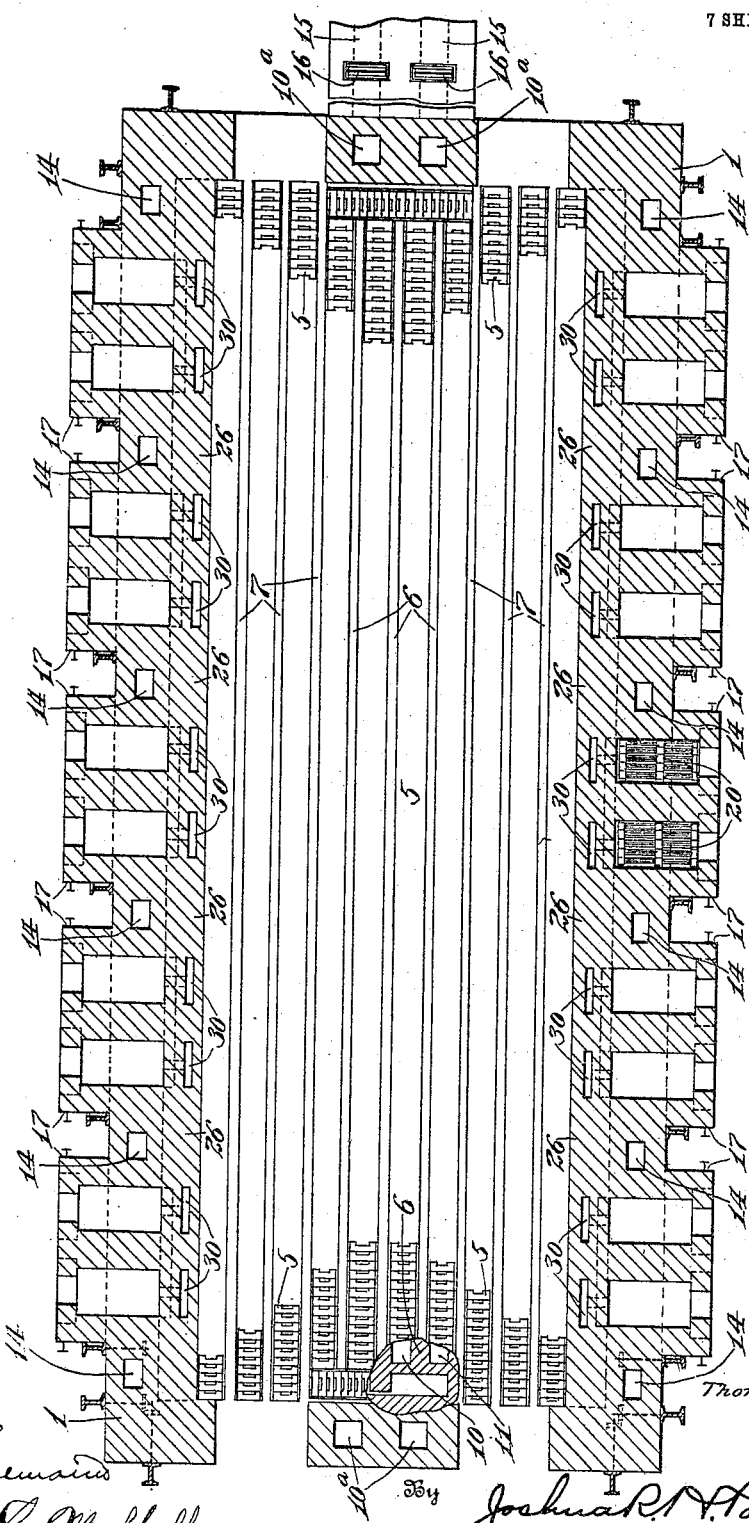
Figure 6:
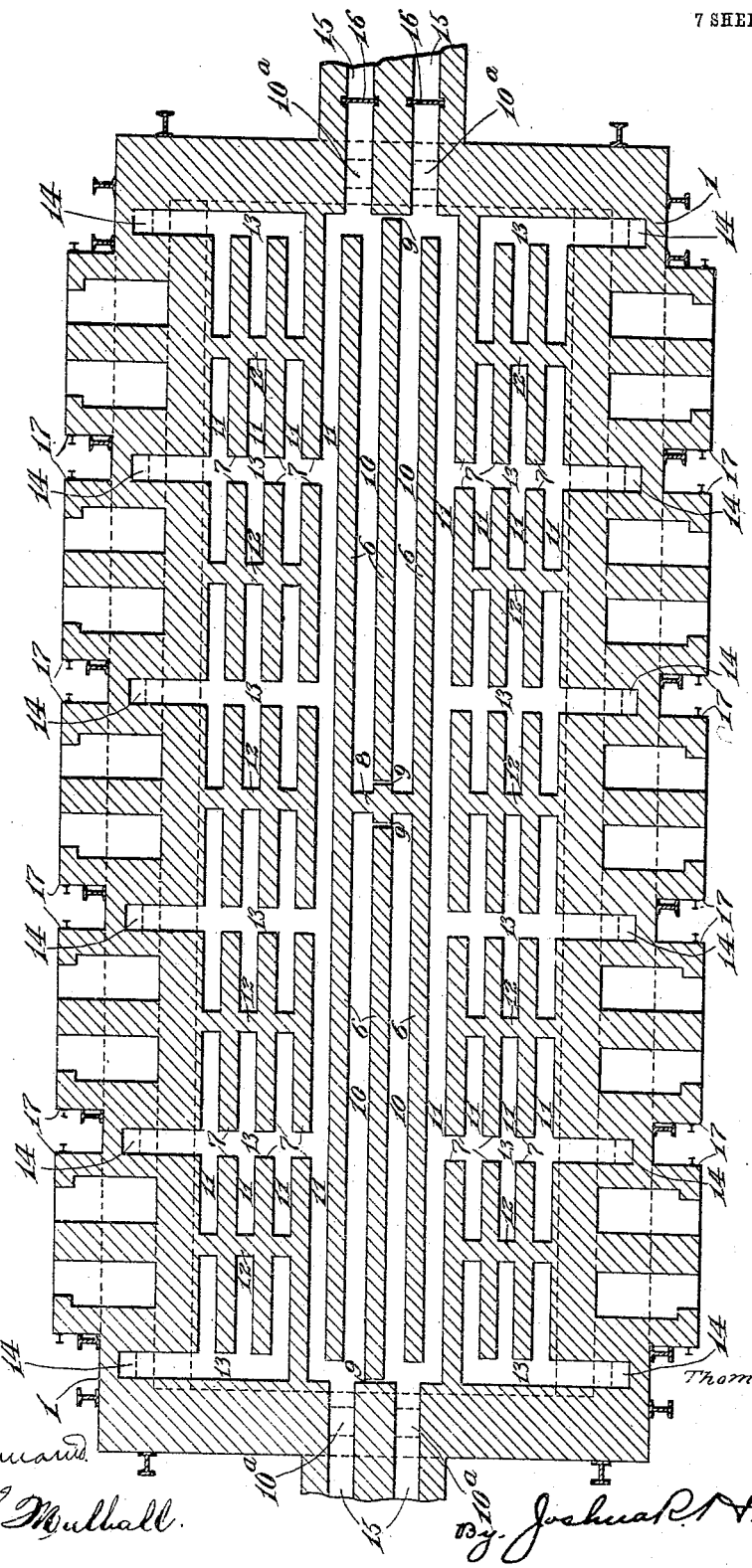

With these and other objects in view, the invention consists in certain novel features of construction, and combinations, and arrangements of parts as will be more fully hereinafter described and pointed out in the claims.
In the accompanying drawings, Figure 1, is a view partly in elevation, partly in longitudinal section through the fire-box, and partly dismantled illustrating my improvements. Fig. 2, is an end view. Fig. 3, is a view in cross section on the line 3—3 of Fig. 1. Fig. 4, is a view in cross section on the line 4—4 of Fig. 1. Fig. 5, is a plan view in horizontal section through the fire-boxes, and showing the kiln floor in plan. Fig. 6, is a plan view taken below the kiln floor. Fig. 7, is an inside face view of the kiln wall taken from a point between the bridge wall and the wall of the kiln, and Fig. 8, is a view similar to Fig. 7, but taken from a point inside of the kiln and looking at the bridge wall.

1 represents the side walls of my improved kiln, 2 the end walls, and 3 the arch connecting the side walls and constituting a roof for the kiln. The ends of the kiln are provided with entrances 4 to admit the workmen in charging and emptying the kiln, it being of course understood that these entrances are sealed during the burning operation.

5 represents the kiln floor, which is composed of fire-brick having spaces between them, constituting an open work structure through which the smoke and gases can freely pass to the flues below. The floor brick are supported upon longitudinal chords 6 and 7 respectively, the chords 6 being long, extending approximately through the length of the kiln and located at the center. Three of these long chords 6 are shown, the two outside ones connected by a cross chord 8 at their center, and the center chord broken at the points 9, to allow for expansion and contraction thereof. This central chord is longer than the other two cords 6, so that the flues 10 provided between said chords communicate with the flues 11 between the shorter chords, so the smoke and gases which pass into these flues 9 may pass around the ends of the outside cord 6, and into the flues 10, which will be hereinafter described. In ordinary operation, however, the smoke and gases from said flues 10 will pass up stacks 10ᵃ at the ends of the kiln. The inner shorter chords 7 at the ends of the kiln, and adjacent to the chords 6, connect with the end walls of the kiln, so as to compel the smoke and gases from the flues 10 to pass backward toward the center of the kiln, as will be readily understood, especially by reference to Fig. 6. The shorter chords 7 are arranged in units of three chords each, having a central cross chord 12 connecting them with the side walls of the kiln, and as the ends of the respective units or series of short chords 7 are spaced apart or are arched over, so as to support the floor brick, they provide a series of laterally extending flues 13 communicating with the stacks 14 in the walls of the kiln.

The end walls of the kiln are provided with openings in line with the central flues 10, and connecting them with flues 15, in which latter, dampers 16 are mounted, and the latter are normally closed during the operation of the burning of the brick. These flues 15 are adapted to be connected with any suitable form of drier, not shown, so that during the cooling operation of the kiln, the dampers 16 may be opened and the waste heat in the kiln utilized for drying. The side walls 1, at points between the stacks 14, are built out as at 17, and a series of my improved furnaces are constructed in this built out portion of the wall. All of the furnaces are exactly alike, and hence the description of one will apply alike to all.

Each furnace comprises a pair of fire-boxes 18 spaced apart by vertical partition walls 19, and arched over at their tops as clearly shown. These fire-boxes are provided with grates 20, and with ashpits below, and as it is desirable that the charging opening to the fire-boxes be smaller than are the openings to the ashpits below, metal plates 21 are embedded in the structure to support the brick work of this overhanging wall portion, to contract the opening to the fire-boxes.

Track bars 22 are secured to the outside wall of the furnace, just above the fire-box openings, and rollers 23 are mounted to run on said track bars. Hangers 24 depend from said rollers, and support doors 25, normally closing the fire-box openings. The track bars are provided with stops at their ends, which prevent the doors from moving in any direction, but toward a central point between the fire-box openings, and as this space is but sufficient to accommodate a single door, it is apparent that but one door can be opened at a time, and hence but one fire-box charged at a time.

Extending throughout the length of the kiln, and on both sides thereof, adjacent to the side walls, bridge walls 26 are located, and are built solid throughout, save at the points hereinafter mentioned. The bridge walls adjacent to each pair of fire-boxes are built forming elongated chambers 27, connecting the pairs of fire-boxes, and between the fire-boxes just above this communicating chamber 27, a space is arched over as at 28, forming vertical partitions separating the passages 29 from the fire-boxes in the kiln chamber, the side walls of the kilns at the upper ends of the passages 29, incline upwardly and inwardly to direct the smoke and gases upward and inward. The purpose of this partition is to compel smoke and gases from a newly charged fire-box, to be drawn up through the passage 29 of its twin fire-box, due to the increased draft and heat of said last mentioned fire-box, and hence compel the more highly heated products in one fire-box to aid in the consumption of the newly charged products of combustion in the other, as the smoke and gases will be drawn along the chamber 27 under the partition 28, into the passage 29 or line of draft of the more highly heated fire-box.

The bridge wall 26 is provided with air ducts 30 extending from a point in the ash-pit to a point near the upper end of the bridge wall to admit outside air and aid in the combustion, and similar ducts 31 are provided in the furnace wall above the fire-boxes and communicate with peep holes 32, the latter at a point in a line, just above the bridge wall, so as to enable an observation of the passage of the smoke and gases, and also admit air to aid in combustion.

The smoke and gases as above explained pass over the bridge wall, thence down between the perforations in the floor into the several flues, and either up the end stacks 10ª, or stacks 14, and all of said stacks are provided with dampers 33, which enable any of said stacks to be closed, to compel the products of combustion to pass up any others of said stacks, and thereby compel the draft of the kiln to be throughout any or all portions, as may be desired, so as to secure the best possible distribution of the heat.

Slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

1. In a kiln, the combination with a perforated floor, of a series of short longitudinal chords below the floor, lateral flues connecting each series of chords at the center with the side walls, constituting a series of short longitudinal flues and short lateral flues, stacks communicating with all of said lateral flues, long longitudinal flues extending from a central point to the ends of the kilns, stacks in the ends of the kiln communicating with said last mentioned flues, the outside chords forming the long longitudinal flues terminating short of the ends of the kiln, and the short longitudinal chords at the ends of the kiln adjacent the long longitudinal chords extending to the end wall of the kiln.

2. In a kiln, the combination with a perforated floor, of parallel longitudinal chords forming longitudinal flues at the center of the kiln, a cross chord at the center of said kiln, and the outside chords of said longitudinal flues terminating short of the end walls of the kiln, stacks in the ends of the kiln communicating with said longitudinal flues, several series of short longitudinal chords on both sides of the center longitudinal chords, and the short lateral chords adjacent the long longitudinal chords at the ends of the kilns connected to the end walls of the kiln, short lateral chords connecting each of said series of short chords with the walls of the kiln, forming short longitudinal flues communicating with short lateral flues, and stacks in the side walls and communicating with all of said lateral flues.

3. In a kiln, the combination with a perforated floor, of parallel longitudinal chords forming longitudinal flues at the center of the kiln, a cross chord at the center of said kiln, and the outside chords of said longitudinal flues terminating short of the end walls of the kiln, stacks in the ends of the kiln communicating with said longitudinal flues, several series of short longitudinal chords on both sides of the center longitudinal chords, and the short lateral chords adjacent the long longitudinal chords at the ends of the kilns connected to the end walls of the kiln, short lateral chords connecting each of said series of short chords with the walls of the kiln, forming short longitudinal flues communicating with short lateral flues, stacks in the side walls and communicating with all of said lateral flues, the flues communicating with the end walls of the kiln and registering with the first mentioned longitudinal flues, and communicating with the short longitudinal flues.

4. In a kiln, the combination with a perforated floor, of parallel longitudinal chords forming longitudinal flues at the center of the kiln, a cross chord at the center of said kiln, and the outside chords of said longitudinal flues terminating short of the end walls of the kiln, stacks in the ends of the kiln communicating with said longitudinal flues, several series of short longitudinal chords on both sides of the center longitudinal chords, and the short lateral chords adjacent the long longitudinal chords at the ends of the kilns connected to the end walls of the kiln, short lateral chords connecting each of said series of short chords with the walls of the kiln, forming short longitudinal flues communicating with short lateral flues, stacks in the side walls and communicating with all of said lateral flues, the flues communicating with the end walls of the kiln and registering with the first mentioned longitudinal flues, and communicating with the short longitudinal flues, dampers in said last mentioned flues and in all of said stacks, and all of said flues located in the same horizontal plane.

5. In a kiln, the combination with a furnace comprising twin fire-boxes, of a bridge wall in front of the fire-boxes, an open space in the bridge wall connecting the discharge ends of both of said fire-boxes, and a vertical partition bridged over said open space, and extending upward from a point between the fire-boxes.

6. In a kiln, the combination with a furnace comprising twin fire-boxes, of a bridge wall in front of the fire-boxes, an open space in the bridge wall connecting the discharge ends of both of said fire-boxes, and a vertical partition bridged over said open space, and extending upward from a point between the fire-boxes, and air ducts in said bridge wall connecting the ashpits of said fire-boxes with the spaces between the bridge wall and the kiln wall, and directing the air to the products of combustion escaping from both of said fire-boxes.

7. In combination with a kiln, a furnace comprising two fire-boxes, a bridge wall in front of the fire-box, a space or opening in the bridge wall connecting the discharge ends of both of the fire-boxes, a vertical partition bridged over said last mentioned space and between the fire-boxes, and the side walls of the kiln inclined inwardly and upwardly at the upper ends of the passages at both sides of said partition.

In testimony whereof I have signed my name to this specification in the presence of two subscribing witnesses.

THOMAS M. WILSON.

Witnesses:
R. H. KRENKEL,
J. A. L. MULHALL.